UNITED STATES PATENT OFFICE.

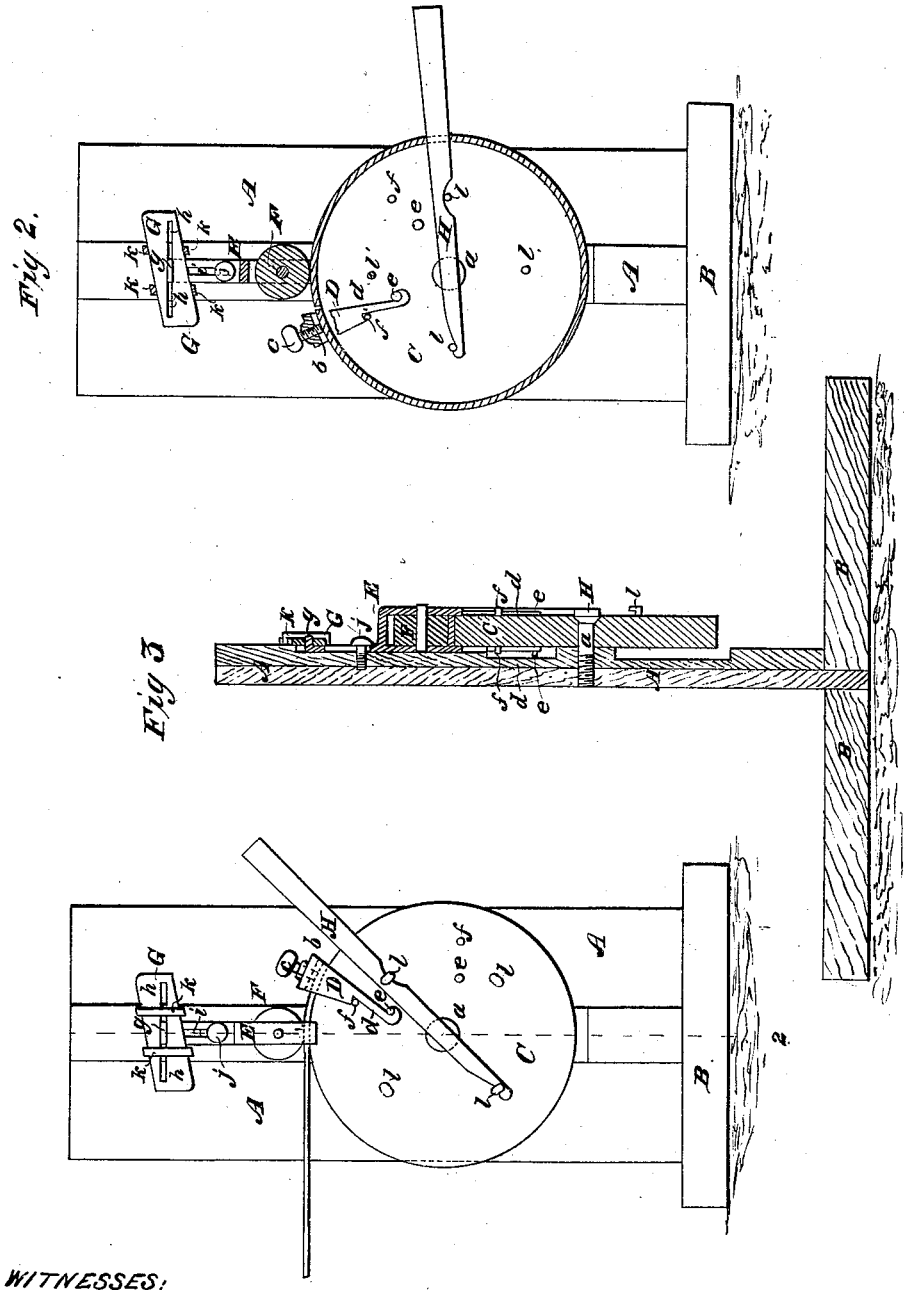

WILLIAM BAILEY, OF LONDON GROVE, PENNSYLVANIA.

MACHINE FOR BENDING TIRES.

Specification of Letters Patent No. 29,556, dated August 14, 1860.

*To all whom it may concern:*

Be it known that I, WILLIAM BAILEY, of London Grove, in the county of Chester and State of Pennsylvania, have invented a new and useful Improvement in Machines for Bending Tires; and I do hereby declare the following to be a full, clear, and exact description of the same, reference being had to the accompanying drawing and to the letters of reference marked thereon.

My invention consists in bending the tire upon a wheel the circumference of which is continuous and unbroken; of a bridle for securing the tire to the wheel, and of an adjustable frame carrying the pressure roller.

To enable others skilled in the art to make and use my invention, I will now proceed to describe its construction and operation.

On reference to the accompanying drawing, which forms part of this specification, Figure 1 is a side view of the machine. Fig. 2 is also a side view, partly in section. Fig. 3 is a section through the line 1—2 Fig. 1.

Similar letters of reference indicate corresponding parts in the several figures.

A is a standard firmly secured to a base B.

C is a wheel, revolving upon a pin $a$, secured in the standard A, having its diameter nearly equal to and its face slightly greater than that of the tire to be bent.

D is a bridle formed of a cross piece $b$, in the center of which works a screw $c$ for biting the end of the tire; and a couple of legs $d$, $d$, the ends of which are bent so as to hook on the pins $e$, $e$ on each side of the wheel C and cut out on one side to receive the pins $f$ $f$ on the same wheel.

E is a frame, set into and guided by the standard A, having a forked end carrying a roller F; a projection $g$ is formed upon its upper end and fits in a slot $h$, of a double inclined plane G; $i$ is an opening cut between the forked end and projection $g$ and through which a pin $j$ passes into the standard A, having a head upon it to keep the frame in its place.

G is a double inclined plane working through the guides $k$, $k$, having a slot $n$ running near its entire length and into which the projection $g$ of the frame E fits.

H is a lever for moving the wheel C and applied to the pins $l$, $l$ upon its front side.

The mode of operating the machine is as follows: The wheel C is first turned around so that the bridle pins $e$, $e$ and $f$, $f$ will occupy the position shown in Fig. 1; and the frame E raised, carrying up the roller F, so as to allow the tire to pass under. The workman now passes the tire between the wheel C and the roller F to the position shown in Fig. 1, then hooks the bridle D upon the pins $e$, $e$ and against the pins $f$, $f$ and lastly brings the screw $c$ down upon the tire and securing it to the wheel. The frame E is now depressed by the wedge G, bringing the roller F in close contact with the tire, as shown in Fig. 1; the lever H is now applied to the pins $l$, $l$, turning the wheel around, drawing the tire under the roller and around the wheel, whose shape it receives; upon the arrival of the wheel at the position shown in Fig. 2 the tire has been bent sufficiently and is ready to be removed, after first taking off the bridle and elevating the frame out of the way.

With this machine one hand does the entire work. The tire is secured to the wheel with ease through the medium of the bridle. The roller is made adjustable to suit the different thicknesses of tire, and its pressure upon the same increased or decreased by a slight tap of the hammer upon the ends of the wedge, and the circumference of the tire made uniform throughout.

I do not claim any of the parts when considered separately, but

I do claim and desire to secure by Letters Patent—

The roller, F when adjusted vertically through the medium of the frame, E and double inclined plane, G, and the bridle, D with its hooked legs, $d$, $d$ and screw, $c$, when they are arranged in respect to and in combination with the continuous wheel, C, substantially as described and for the purpose specified.

In testimony whereof, I have signed my name to this specification in the presence of two subscribing witnesses.

WILLIAM BAILEY.

Witnesses:
BENNETT S. WALTON,
ROBERT L. PYRE.